United States Patent [19]

Saito et al.

[11] Patent Number: 5,158,822
[45] Date of Patent: Oct. 27, 1992

[54] MAGNETIC RECORDING MEDIUM AND PROCESS FOR THE PREPARATION THEREOF

[75] Inventors: Shinji Saito; Naoyoshi Chino, both of Kanagawa, Japan

[73] Assignee: Fuji Photo Film Co., Ltd., Kanagawa, Japan

[21] Appl. No.: 829,542

[22] Filed: Feb. 4, 1992

Related U.S. Application Data

[63] Continuation of Ser. No. 692,346, Apr. 26, 1991, abandoned.

[30] Foreign Application Priority Data

Apr. 26, 1990 [JP] Japan .................................. 2-111181

[51] Int. Cl.$^5$ .............................................. G11B 23/00
[52] U.S. Cl. ...................... 428/212; 427/127; 427/128; 427/130; 427/131; 428/213; 428/216; 428/323; 428/336; 428/694; 428/900
[58] Field of Search ............... 428/212, 213, 216, 323, 428/329, 336, 694, 900; 427/127, 131, 128, 130

[56] References Cited

U.S. PATENT DOCUMENTS

| | | | |
|---|---|---|---|
| 2,643,130 | 11/1949 | Kornei | 360/131 |
| 4,091,158 | 5/1978 | Kasuga et al. | 428/216 |
| 4,409,281 | 10/1983 | Kitamoto et al. | 428/212 |
| 4,741,953 | 5/1988 | Katsuta et al. | 428/694 |
| 4,851,289 | 7/1989 | Ogawa et al. | 428/694 |

OTHER PUBLICATIONS

Patent Abstracts of Japan, vol. 9, No. 24 (P-331) (1747) 31 Jan. 1985, & JP-A-59 167845 (Hitachi Maxell K.K.) 21 Sep. 1984.

Primary Examiner—Paul J. Thibodeau
Assistant Examiner—Leszek Kiliman
Attorney, Agent, or Firm—Sughrue, Mion, Zinn, Macpeak & Seas

[57] ABSTRACT

A novel magnetic recording medium is disclosed which comprises a non-magnetic support having thereon at least three magnetic layers each layer of which containing a ferromagnetic powder dispersed in a binder, wherein the outermost magnetic layer arranged farthest from the support has a dry thickness of 1 μm or less, and the at least three magnetic layers each exhibit coercive force Hc (Oe) satisfying the following relationships:

(when $Dn \leq 1$ μm)

$$H_1 - \frac{Dn \cdot H_1}{1} \leq Hn \leq H_1 - \frac{Dn \cdot H_1}{4} \quad (I)$$

(when $1$ μm $< Dn \leq 4$ μm)

$$H_1 - \frac{Dn \cdot H_1}{4} \leq Hn \leq H_1 - \frac{Dn \cdot H_1}{40} \quad (II)$$

wherein $H_1$ represents Hc of the outermost magnetic layer; $Hn$ represents Hc of the magnetic layer which is the n-th layer from the outermost magnetic layer and arranged between the outermost layer and the non-magnetic support; and $Dn$ represents the distance (μm) from the top surface of the outermost magnetic layer to the top surface of the n-th layer. A novel process for the preparation of the magnetic recording medium is also disclosed.

15 Claims, 1 Drawing Sheet

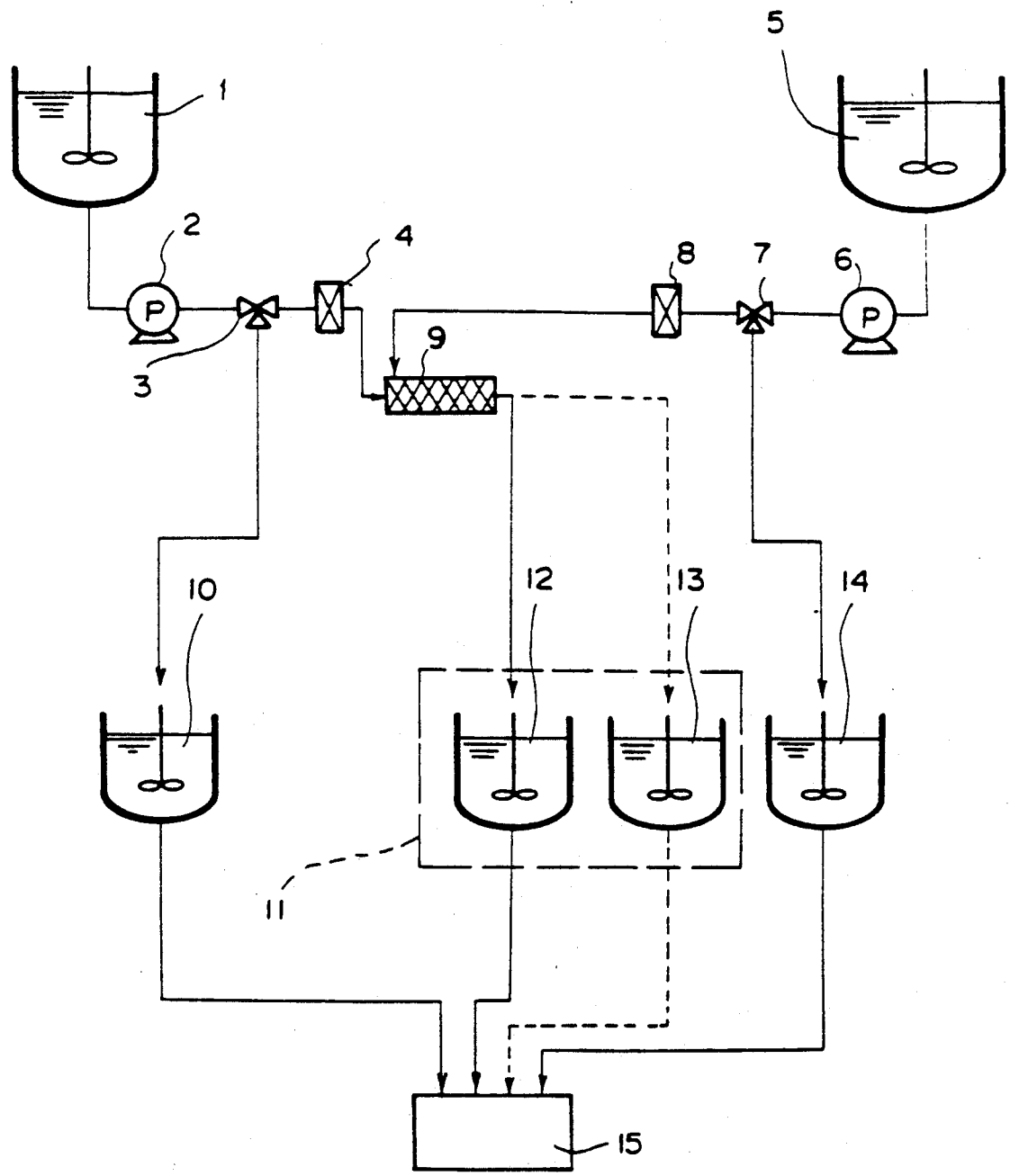

MAGNETIC RECORDING MEDIUM AND PROCESS FOR THE PREPARATION THEREOF

This is a continuation of application Ser. No. 07/692,346 filed Apr. 26, 1991, now abandoned.

FIELD OF THE INVENTION

The present invention relates to a magnetic audio or video recording medium having excellent electromagnetic characteristics.

BACKGROUND OF THE INVENTION

In recent years, in response to a high demand for excellent sound and image quality, various techniques have been developed to improve the electromagnetic characteristics of magnetic recording media.

The proposed techniques include those directed to the intensity of the recorded magnetic field and the depth of recording, wherein two magnetic layers are employed to improve the electromagnetic characteristics of the magnetic recording medium.

Most typical of these techniques, two magnetic layers are employed wherein Hc of the lower layer closest to the support is less than that of the upper layer to facilitate recording in the depths of the magnetic layer, such that the electromagnetic characteristics of magnetic recording media are improved. Recording in the "depths" of the magnetic layer as used herein refers to recording that occurs below the surface of the magnetic layer and at various distance orthogonal to the plane surface of the magnetic layer. Examples of these techniques include those described in JP-B-52-28364 (the term "JP-B" as used herein means an "examined Japanese patent publication"), and JP-A-60-124025, 60-256917, 52-51908, 51-21304, 54-48504, 57-33435, 57-69528, 50-31804, 53-54002, 56-30608, 59-167845, 58-64634, and 61-214223 (the term "JP-A" as used herein means an "unexamined published Japanese patent application").

However, even the above described magnetic recording medium comprising two layers does not meet the present demand for excellent electromagnetic characteristics.

Furthermore, with the diversification of systems for recording on magnetic recording media, the adjustment of Hc of the two magnetic layers is not necessarily adequate for all recording systems.

It has been found that although magnetic recording media are required to be adapted to a number of different recording systems such as FM video signal recording, digital video recording, HiFi sound recording, analog sound recording, and digital sound recording, even various magnetic recording media comprising two layers, let alone conventional single-layer magnetic recording media, are still not satisfactory because different recording systems provide different recording magnetic fields and employ different recording depths.

It has also been found that if the difference in Hc between the two magnetic layers is increased to thereby increase the output of recording in the depths of the magnetic layer, the frequency characteristics in the middle range are deteriorated or noise results, thus adversely effecting the practical audio and video qualities.

In order to solve these problems, a magnetic recording medium having a three-layer structure is proposed in JP-A-59-167845. However, it was found that even such a three-layer magnetic recording medium does not provide sufficient electromagnetic characteristics because each of these layers, particularly the outermost layer, is relatively thick. In a short wavelength recording system such as video recording and digital recording in particular, the benefits of such a structure having three or more layers is not realized unless the outermost layer is thinly coated.

SUMMARY OF THE INVENTION

An object of the present invention is to provide a magnetic recording medium which is adapted to a variety of recording systems, including FM video signal recording, digital video recording, HiFi audio recording, analog audio recording, and digital recording.

The above and other objects of the present invention will become apparent from the following detailed description and examples.

After extensive study, the present inventors have discovered a novel magnetic recording medium comprising three or more layers which solves the above described problems. In particular, by selecting a prescribed thickness and Hc for each of these layers, the present inventors have provided a magnetic recording medium which unprecedently provides excellent electromagnetic characteristics independent of the recording system being employed.

Considerable time and facilities are required to prepare dispersions containing different ferromagnetic powders for different layers.

The present inventors have also discovered that the mixing of a coating solution for the outermost layer having a relatively high Hc and a coating solution for the lowermost layer having a relatively low Hc provides a coating solution having a Hc suitable for an interlayer, thus simplifying the preparation of the dispersions necessary for such a multilayer structure.

It was further discovered that a product obtained by coating an interlayer dispersion prepared by mixing two or more coating solutions to provide an interlayer having the desired characteristics, as compared to a product obtained by coating dispersions having different ferromagnetics for different layers, shows little or no difference in electromagnetic characteristics. Such a comparison rather shows that the former provides less noise in the recording of signals having a relatively long wavelength (e.g., chroma signal in video recording).

The above-mentioned object of the present invention is accomplished by providing a magnetic recording medium comprising on a non-magnetic support having thereon at least three magnetic layers each layer of which containing a ferromagnetic powder dispersed in a binder, wherein the outermost magnetic layer arranged farthest from the support has a dry thickness of 1 μm or less, and said at least three magnetic layers each exhibit a coercive force Hc (Oe) satisfying the following relationships:

(when $Dn \leq 1$ μm)

$$H_1 - \frac{Dn \cdot H_1}{1} \leq Hn \leq H_1 - \frac{Dn \cdot H_1}{4} \quad (I)$$

(when $1$ μm $< Dn \leq 4$ μm)

$$H_1 - \frac{Dn \cdot H_1}{4} \leq Hn \leq H_1 - \frac{Dn \cdot H_1}{40} \quad (II)$$

wherein $H_1$ represents Hc of the outermost magnetic layer; Hn represents Hc of the magnetic layer which is the n-th layer from said outermost magnetic layer and arranged between the outermost layer and the non-magnetic support; and Dn represents the distance ($\mu$m) from the top surface of the outermost magnetic layer to the top surface of the n-th layer.

Furthermore, the above object of the present invention is accomplished by a process for the preparation of a magnetic recording medium, comprising the steps of kneading and dispersing a first ferromagnetic powder in a binder to prepare a magnetic coating solution having an $H_c$ of Hn for a lowermost layer to be arranged nearest to a non-magnetic support, kneading and dispersing a second ferromagnetic powder in a binder to prepare a magnetic coating solution having an Hc of $H_1$ different than Hn for the outermost layer, mixing the magnetic coating solution for the lowermost layer and the magnetic coating solution for the outermost layer in such ratio as to provide at least one magnetic coating solution for an interlayer having a predetermined Hc intermediate that of the lowermost and outermost layers, simultaneously coating the magnetic coating solution for the lowermost layer, the one or more magnetic coating solutions for the interlayer and the magnetic coating solution for the outermost layer on the non-magnetic support to form a plurality of magnetic layers, subjecting the magnetic layers to orienting treatment, drying the magnetic layers, and then calendering the magnetic recording medium.

BRIEF DESCRIPTION OF THE DRAWING

By way of example and to supplement the description provided herein, reference is made to the accompanying drawing.

The figure is a schematic view of the process for mixing magnetic coating liquids in accordance with the present invention.

DETAILED DESCRIPTION OF THE INVENTION

The present invention concerns the relationship between the total thickness of the constituent magnetic layers, position from the surface and Hc of each of the constituent magnetic layers of the magnetic recording medium, comprising three or more magnetic layers and preferably three to five magnetic layers. As used herein the "top" surface of a magnetic layer is the surface that is furthest from the support. The distance Dn is the vertical distance from the top surface of the outermost magnetic layer arranged farthest from the support to the top surface of the N-th magnetic layer. The thickness of the magnetic layer is the dry thickness. The relationship (I) is applied to the case where the total combined dry thickness of the magnetic layers is 1 $\mu$m or less, or to an individual magnetic layer having Dn of 1 $\mu$m or less. The relationship (II) is applied to an individual magnetic layer having Dn of more than 1 $\mu$m to 4 $\mu$m. In a three-layered magnetic layer unit of the present invention, the distances $D_2$ and $D_3$ are preferably in the ranges of from 0.1 to 1.0 $\mu$m and more than 1.0 $\mu$m, respectively. In a four-layered magnetic layer unit of the present invention, the distances $D_2$, $D_3$ and $D_4$ are preferably in the ranges of from 0.1 to 0.5 $\mu$m, from more that 0.5 to 1.0 $\mu$m and more than 1.0 $\mu$m, respectively.

The magnetic recording medium of the present invention provides a remarkable improvement in electromagnetic characteristics such as video output, chromatic output, chromatic S/N, FM audio output, and audio output by satisfying these relationships. Although not to be construed as being limited to any particular theory of operation, the magnetic recording medium of the present invention is considered to exhibit excellent electromagnetic characteristics for the following reasons.

In a magnetic recording medium for AC bias analog recording of a signal having a relatively long wavelength, the magnetic layers which are arranged at a distance of more than 1 $\mu$m from the surface of the outermost magnetic layer and which experience a low recording magnetic field, provide for easy recording and an improved output when the Hc of the magnetic layer is reduced. This finding is based on the discovery by the present inventors that the optimum Hc can be provided depending on the distance from each layer to the magnetic head to uniformly improve output at various frequencies. It was also discovered by the present inventors that the deteriorated frequency characteristics in the middle frequency range, which is encountered in prior art two-layer structures, can be eliminated by providing three or more magnetic layers wherein the magnetic layers are prepared having a substantially continuous gradation with respect to Hc.

The present inventors further discovered that the magnetic recording medium for recording of audio or video signal in a saturated digital process and a magnetic recording medium adapted for recording of video signals in a chromatic signal low band conversion process or for recording audio signals in an FM process wherein recording is conducted of signals having a short wavelength, exhibit a remarkable improvement in output by providing three or more magnetic layers having a total thickness of 1 $\mu$m or less, each layer of which having an optimum Hc in accordance with the relationship (I).

The present inventors further discovered that even if the above described process for recording of a signal having a relatively long wavelength (e.g., audio recording) and the above described process for recording of a signal having a relatively short wavelength (e.g., video recording) are carried out at the same time, excellent output for both recording processes is obtained at the same time by adjusting Hc of the magnetic layer in the portion 1 $\mu$m or less deep from the magnetic layer having the portion 1 $\mu$m or less deep from the surface and having the portion greater than 1 $\mu$m deep from the respectively.

In the present invention, it is important that the vertical gradation of Hc in the magnetic layer 1 $\mu$m or less deep from the surface in which a short wavelength signal is to be recorded be large (the relationship (I)), while that of Hc in the magnetic layer greater than 1 $\mu$m deep from the surface in which a long wavelength signal is to be recorded be small (the relationship (II)). This is because Hc shows a rapid change in the recording of a short wavelength signal and a slow change in the recording of a long wavelength signal.

Thus, the magnetic recording medium of the present invention simultaneously provides a high output of various signals having different wavelengths.

The present invention can be achieved by incorporating a plurality of ferromagnetic powders having different Hc characteristics in different magnetic layers. Preferably, magnetic coating solutions for the outermost magnetic layer and the magnetic layer closest to the support are prepared, while magnetic coating solutions for one or more interlayers are prepared by properly mixing the above-noted two magnetic coating solutions. Ferromagnetic powders for use in the present invention include those which have been heretofore known and commonly used.

The term "magnetic coating solution" as used herein means a liquid comprising all of or some of a ferromagnetic powder, a binder and a solvent kneaded or dispersed therein. The magnetic coating solution may further comprise additives generally incorporated in conventional magnetic recording media, such as a lubricant, an abrasive, a dispersant, an antistatic agent, and a hardener. The mixing of the two magnetic coating solutions prepared for the outermost and lowermost magnetic layers may be accomplished by a batch mixing process, or preferably by a continuous mixing process with control over the flow rate. The mixing may also be accomplished by means of a static mixer or agitator. A disperser may optionally be employed in the process. A mixing process in accordance with the present invention is illustrated in the figure.

In reference to the figure, a magnetic coating solution 1 for the outermost magnetic layer is prepared from a coating solution containing a ferromagnetic powder having an Hc suited for the outermost magnetic layer (e.g., an Hc in accordance with the relationship (I)), while a magnetic coating solution 5 for the lowermost layer is prepared from a coating solution containing a ferromagnetic powder having an Hc suited for the lowermost magnetic layer (e.g., an Hc in accordance with the relationship (II)). The magnetic coating solutions 1 and 5 thus prepared are then transported by means of pumps 2 and 6; respectively, and shunted through switch valves 3 and 7 to a holding tank containing the magnetic coating solution 10 for coating the outermost magnetic layer and to a holding tank containing the magnetic coating solution 14 for coating the lowermost magnetic layer, respectively. On the other hand, the magnetic coating solution 1 for the outermost magnetic layer and the magnetic coating solution 5 for the lowermost magnetic layer are mixed in predetermined proportions by means of a static mixer 9 while the flow rates of the incoming coating solutions are controlled through flowmeters 4 and 8, respectively, to prepare a magnetic coating solution 11 for an interlayer.

The magnetic coating solution 11 for the interlayer may be used as a magnetic coating solution 12 for a single interlayer, i.e., 2nd layer. Alternatively, the magnetic coating solution 12 for the 2nd layer and a magnetic coating solution 13 for the 3rd layer may be prepared by changing the mixing ratio of the magnetic coating solution 1 for the outermost layer and the magnetic coating solutions 5 for the lowermost layer. As necessary, magnetic coating solutions for a 4th layer, 5th layer, and so on may be similarly prepared. The magnetic coating solution 14 for the lowermost layer, the magnetic coating solution 11 an the interlayer, and the magnetic coating solution 10 for the outermost layer thus prepared are then sent to a multilayer coating head 15 used to coat a non-magnetic support to obtain a magnetic recording medium of the present invention.

In order to obtain a magnetic recording medium comprising three or more layers of the present invention, the ability to form magnetic layers each having an extremely small thickness, e.g., of from 0.05 to 1.0 $\mu$m is required. In accordance with conventional coating process which comprise coating a layer, drying the coat, and then coating another layer thereon, it is quite difficult to obtain a uniformly thin layer, and likewise, a magnetic recording medium of the present invention. In the present invention, a thin film can be obtained by a simultaneous multilayer coating process as disclosed, for example, in JP-A-62-212933, 63-88080, and 58-109162.

Ferromagnetic powders, binders and other additives for use in the present invention include those described in Japanese Patent Application No. 1-54254.

The grain diameter of the ferromagnetic powder particles for use in the present invention along the major axis is 0.5 $\mu$m or less, preferably 0.3 $\mu$m or less. The major axis length of the ferromagnetic powder contained in the outermost magnetic layer is preferably less than that of the ferromagnetic powder contained in the lowermost magnetic layer. The ratio of the major axis length to the minor axis length, i.e., the a circular ratio, is in the range of from 2 to 20. The term "major axis" as used herein means the longest axis in the three axes of grain, and the term "minor axis" as used herein means the "shortest axis in the three axes of grain".

The ferromagnetic powder for use in the present invention has a specific surface area of from 25 to 80 $m^2/g$, and preferably from 35 to 60 $m^2/g$ as determined by the BET process. If the specific surface area of the ferromagnetic powder is 25 $m^2/g$ or less, a noise level tends to increase. On the other hand, if the specific surface area of the ferromagnetic powder is greater than 80 $m^2/g$, it is sometimes difficult to obtain the desired surface properties. The specific surface area of the ferromagnetic powder contained in the outermost magnetic layer is preferably greater than that of the ferromagnetic powder contained in the lowermost magnetic layer. The crystalline size of the ferromagnetic powder for use in the present invention is in the range of from 100 to 450 angstroms, and preferably from 150 to 350 angstroms. The crystalline size of the ferromagnetic powder contained in the outermost magnetic layer is preferably smaller than that of the ferromagnetic powder contained in the lowermost magnetic layer. The ferromagnetic powder for use in the present invention has an Hc of from 200 to 2,000 Oe, and preferably from 350 to 1,600 Oe.

For magnetic properties as determined in a magnetic field of 5 KOe, the magnetic recording medium of the present invention exhibits a squareness ratio of 0.7 or more, preferably 0.8 or more, more preferably 0.9 or more.

The ferromagnetic powder for use in the present invention exhibits os of 50 emu/g or more, and preferably 70 emu/g or more. A ferromagnetic metal fine powder preferably has os of 100 emu/g or more. The ferromagnetic powder for use in the present invention preferably has a water content of 0.01 to 2 %. The water content of the ferromagnetic content is optimized depending on the type of binder selected.

If a cobalt-modified iron oxide is used as the present ferromagnetic power, the ratio of the content of divalent iron to trivalent iron is preferably in the range from 0 : 1 to 0.2 : 1 and more preferably from 0.05 1 to 0.10 to 1, respectively, on an atomic basis.

The content of cobalt atom in a cobalt-malified iron oxide for use in the present invention is in the range of from 0 to 15 % on an atomic basis, preferably from 3 to 8 % based on the content of iron atom. The pH value of the ferromagnetic powder is selected depending on the particular binder being used. The pH value of the ferromagnetic powder is generally in the range of from 4 to 12, preferably from 6 to 10.

The ferromagnetic powder for use in the present invention may be surface-treated with Al, Si, P or an oxide thereof. The amount of a material for use in surface-treating the ferromagnetic powder is in the range of from 0.1 to 10 % by weight based on the amount of the ferromagnetic powder.

The ferromagnetic powder may contain a soluble inorganic ion such Na, Ca, Fe, Ni and Sr. The presence of an inorganic ion in an amount of 500 ppm or less generally does not adversely effect the properties of the ferromagnetic powder.

Ferromagnetic powders for use in the present invention include known ferromagnetic powders such as γ-FeOx (x=1.33 to 1.5), Co-modified γ-FeOx (x=1.33 to 1.5), ferromagnetic alloy mainly comprising Fe, Ni or Co as a main component (75 atom % or more), barium ferrite, and strontium ferrite. The a ferromagnetic powder may further contain other atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B.

The ferromagnetic powder for use in the present invention may be treated with a dispersant, lubricant, surface active agent or antistatic agent as described below before dispersion.

Among the above described ferromagnetic powders, the ferromagnetic alloy powder may contain a small amount of hydroxide or oxide. Materials obtained by any known process for the preparation of ferromagnetic alloy powder can be used. Examples of such a process include those described below.

In particular, examples of processes for preparing a ferromagnetic alloy 5 powder of the present invention include reduction of a composite organic acid salt (mainly an oxalate) with a reducing gas such as hydrogen, reduction of iron oxide with a reducing gas such as hydrogen to obtain Fe or Fe-Co grains, thermal decomposition of a metallic carbonyl compound, addition of a reducing agent such as sodium borohydride, hypochlorite and hydrazine to an aqueous solution of a ferromagnetic metal compound to reduce, and evaporating of a metal in an inert gas under reduced pressure to obtain a finely divided powder of the metal. The ferromagnetic alloy powder thus obtained may then be subjected to a known gradual oxidation process, e.g., dipping the material in an organic solvent, and then drying the material; dipping the material in an organic solvent, supplying an oxygen-containing gas into the system to form an oxide layer thereon, and then drying the material; or adjusting the partial pressure of oxygen gas and an inert gas without using any organic solvent to form an oxide layer on the surface of the material.

The ferromagnetic powder for use in the present invention preferably has a porosity of 20% by volume or less, and more preferably 5% by volume or less.

The preparation of the ferromagnetic powder for use in the present invention can be accomplished by any known method. The ferromagnetic powder for use in the present invention may be a circular, granular, rice-like or tabular in shape as long as it meets the requirements for grain size.

The binder for use in the present invention includes known thermoplastic resins, thermosetting resins, reactive resins, or mixture thereof.

The thermoplastic resin for use in the present invention has a glass transition temperature of from $-100°$ C. to $150°$ C., a number average molecular weight of from 1,000 to 200,000, preferably 10,000 to 100,000, and a polymerization degree of about 50 to 1,000.

Examples of useful a thermoplastic resin include polymers or copolymers containing constituent units derived from vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal, vinyl ether, or the like, polyurethane resins, and various rubber resins.

Examples of useful thermosetting resins and reactive resin include phenolic resin, epoxy resin, polyurethane hardening resin, urea resin, melamine resin, alkyd resin, acrylic resin, formaldehyde resin, silicone resin, epoxypolyamide resin, a mixture of polyester resin and isocyanate prepolymer, a mixture of polyester polyol and polyisocyanate, and a mixture of polyurethane and polyisocyanate.

Resins for use in the present invention are further described in "Plastic Hand Book", published by Asakura Shoten.

Conventional electron-beam curable resins can also be used in the present invention. For preparation and examples thereof, reference may be made to JP-A-62-256219.

The above described resins can be used alone or in combination. Preferred examples of combined resins for use in the present invention include a combination of a polyurethane resin and at least one of vinyl chloride resin, vinyl chloridevinyl acetate resin, vinyl chloride-vinyl acetate-vinyl alcohol copolymer, and vinyl chloride-vinyl acetate-maleic anhydride copolymer. The combined resins may be further combined with a polyisocyanate.

The polyurethane resin for use in the present invention includes known structure such as polyester polyurethane, polyether polyurethane, polyether polyester polyurethane, polycarbonate polyurethane, polyester polycarbonate polyurethane, and polycaprolactone polyurethane.

The polyurethane for use in the present invention preferably has a glass transition temperature of from $-50°$ C. to $100°$ C., a breaking extension of from 100 to 2,000%, a breaking stress of from 0.05 to 10 kg/cm$^2$, and a breakdown point of from L. 0.05 to 10 kg/cm$^2$.

Examples of polyisocyanates for use in the present invention include isocyanates such as tolylene diisocyanate, 4-4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate, reaction products of these isocyanates with a polyalcohol, and polyisocyanates obtained by the condensation of isocyanates. Commercially available examples of such isocyanates include Colonate L, Colonate HL, Colonate 2030, and Colonate 2031 available from Nihon Polyurethane Co., Ltd.; Takenate D-102, Takenate D-110N, Takenate D-200, and Takenate D-202 available from Takeda Chemical Industries, Ltd.; and Desmodule L, Desmodule IL, Desmodule N, and Desmodule HL available from Sumitomo Bayer Co., Ltd. The polyisocyanates can be used alone or in combination. When the polyisocyanates are used in combination, their difference in hardening reactivity can be used to advantage.

In order to obtain a better dispersibility and durability, all the above described binder resins may optionally comprise at least one polar group selected from —COOM, —SO$_3$M, —OSO$_3$M, —P=O(OM)$_2$, —O—P=O (OM)$_2$ (wherein M represents a hydrogen atom or alkali metal), —OH, —NR$_2$, N$^+$R$_3$ (wherein R represents a hydrocarbon group), epoxy group, SH, and CN incorporated into the resin by copolymerization or an addition reaction. The polar group is preferably contained in the binder resin in an amount of from $1 \times 10^{-1}$ to $1 \times 10^{-8}$ mol/g, more preferably $1 \times 10^{-2}$ to $1 \times 10^{-6}$ mol/g of the binder.

Specific examples of the binder resin for use in the present invention include VAGH, VYHH, VMCH, VAGF, VAGD, VROH, VYES, VYNC, VMCC, XYHL, XYSG, PKHH, PKHJ, PKHC, and PKFE available from Union Carbide; MPR-TA, MPR-TA5, MPR-TAL, MPR-TSN, MPR-TMF, MPR-TS, and MPR-TM available from Nisshin Kagaku Kogyo K.K.; 1000W, DX80, DX82, and DX83 available from The Electro Chemical Industrial Co., Ltd.; MR110, MR100, and 400X110A available from The Japanese Geon Co., Ltd.; Nippollan N2301, N2302, and N2304 available from Nihon Polyurethane Co., Ltd.; Pandex T-5105, T-R3080, T-5201, Burnock D-400, D-210-80, and Crisvon 6109 and 7209 available from Dainippon Ink And Chemicals, Inc.; Vylon UR8200, UR8300, RV530, and RV280 available from Toyobo Co., Ltd.; Difelamine 4020, 5020, 5100, 5300, 9020, 9022, and 7020 available from Dainichiseika Colour and Chemicals Mfg. Co., Ltd.; MX5004 available from Mitsubishi Chemical Industries Ltd.; Sunprene SP-150 available from Sanyo Kasei K.K.; and Saran F310 and F210 available from Asahi Kasei Kogyo K.K.

The binder is contained in each magnetic layer in the present invention generally in an amount of from 5 to 50 % by weight, preferably 10 to 30 % by weight based on the weight of the ferromagnetic powder contained in the same layer. A vinyl chloride resin if used, is preferably contained in the magnetic layer in an amount of from 5 to 30 % by weight; a polyurethane resin, if used, is preferably contained in the magnetic layer in an amount of from 2 to 20 % by weight; and a polyisocyanate if used in combination therewith, is preferably contained in the magnetic layer in an amount of from 2 to 20% by weight, each based on the weight of the ferromagnetic powder contained in the same layer.

The magnetic layers of the present invention may contain carbon black such as rubber furance black, rubber thermal black, color carbon black, acetylene black, etc., and abrasives.

The carbon black for use in the present invention preferably has a specific surface area of from 5 to 500 m$^2$/g, a DBP oil absorption of from 10 to 400 ml/100 g, a grain diameter from of 5 to 300 mμ, a pH value of from 2 to 10, a water content of from 0.1 to 10 %, and a tap density of from 0.1 to 1 g/cc.

Specific examples of carbon black for use in the present invention include BLACKPEARLS 2000, 1300, 1000, 900, 800, and 700, and VULCAN XC-72 available from Cabot; #80, #60, #55, #50, and #35 available from Asahi Carbon K.K.; #2400B, #2300, #900, #1000, #30, #40, and #10B available from Mitsubishi Chemical Industries Ltd.; and CONDUCTEX SC, RAVEN 150, 50, 40, and 15 available from Columbia Carbon K.K. The carbon black may be surface treated with a dispersant, etc., graft- polymerized with a resin, or partially graphite-loaded before use.

Furthermore, the carbon black may be dispersed in the binder before being incorporated into the magnetic coating solution.

The various carbon blacks may be used alone or in combination. Carbon black, when used, is contained in one or more of the magnetic layers in an amount of from 0.1 to 30% by weight based on the weight of ferromagnetic powder contained in the same layer.

Carbon black serves to inhibit static charge, reduce the friction coefficient, provide light screening properties, and improve film strength. The functions served depend on the type of carbon black used. Thus, the carbon black is selected depending on the application based on grain size, oil absorption, electrical conductivity, pH, etc., by changing the type, amount and combinations thereof.

For carbon blacks for used in the present invention, reference can be made to "Handbook of Carbon Black", Association of Carbon Black.

Abrasives for use in the present invention include known materials having a Mohs' hardness of 6 or more, such as α-alumina with a percent conversion of 90% or more, β-alumina, silicon carbide, chromium oxide, cerium oxide, α-iron oxide, corundum, artificial diamond, silicon nitride, silicon carbon, titanium carbide, titanium oxide, silicon dioxide, and boron nitride, used alone or in combination. Alternatively, a composite of these abrasives (e.g., an abrasive surface-treated with another abrasive) can be used. The abrasive may contain compounds or elements other than the main constituent components thereof, and maintains its effects as long as the content of the main constituent components is 90 wt % or more. The abrasive preferably has a grain size of from 0.01 to 2 μm. If necessary, a plurality of abrasives having different grain sizes may be used in combination, or a single abrasive having a wide distribution of grain diameters may be used to provide a similar effect. The abrasive preferably has a tap density of 0.3 to 2 g/cc, a water content of from 0.1 to 5 %, a pH value of from 2 to 11, and a specific surface area of from 1 to 30 m$^2$/g.

The abrasive for use in the present invention may be spherical or cubic in shape, but preferably has at least some edges on portions thereof to provide a high abrasive action.

Specific examples of abrasives for use in the present invention include AKP-20, AKP-30, AKP-50, and HIT-50 available from Sumitomo Chemical Co., Ltd.; G5, G7, and S-1 available from The Nippon Chemical Industrial Co., Ltd.; and 100ED, and 140ED available from Toda Kogyo K.K.

The abrasive may be dispersed in the binder before being incorporated into the magnetic coating solution.

Other additives may also be added to one or more of the magnetic layers of the present invention, including those which exhibit a lubricating effect, an intestate effect, a dispersing effect, a plasticizing effect, etc. Examples of additives for use in the present invention include molybdenum disulfide, tungsten disulfide, graphite, boron nitride, fluorinated graphite, silicone oil, silicones containing polar groups, aliphatic acid-modified silicone, fluorine-containing silicone, fluorine-containing alcohol, fluorine-containing ester, polyolefin, polyglycol, ester alkylphosphates and alkali metal salts thereof, ester alkylsulfates and alakli metal salts thereof, polyphenyl ethers, fluorine-containing ester alkylsulfates and alkali metal salts thereof, $C_{10-24}$ monobasic aliphatic acids (which may contain unsaturated bonds or which may be branched) and salts thereof with a metal (e.g., Li, Na, K, Cu), $C_{12-22}$ mono-, di-, tri-, tetra-, penta- or hexahydric alcohols (which may contain unsaturated bonds or which may be branched), $C_{12-22}$ alkoxyalcohols, mono-, di- or trialiphatic fatty acid esters made from $C_{10-24}$ monobasic aliphatic acids (which may contain unsaturated bonds or which may be branched) and any one of $C_{2-12}$ mono-, di-, tri-, penta- or hexahydric alcohols (which may contain unsaturated bonds or which may be branched), aliphatic esters of monoalkyl ethers of alkylene oxide polymers, $C_{8-22}$ aliphatic amides, and $C_{8-22}$ alpthatic amines. Specific examples of these compounds include lauric acid, myristic acid, palmitic acid, stearic acid, behenic acid, butyl stearate, oleic acid, linoleic acid, linolenic acid, elaidic acid, stearic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

Other examples of additives for use in the present invention include nonionic surface active agents such as alkylene oxide surface active agents, glycerin surface active agents, glycidol surface active agents, and alkyl phenol-ethylene oxide addition products, cationic surface active agents such as cyclic amines, ester amides, quaternary ammonium salts, hydantoin derivatives, heterocyclic compounds phosphonium, and sulfonium, anionic surface active agents containing acid groups such as carboxylic acid, sulfonic acid, phosphoric acid, ester sulfate, and ester phosphate, and amphoteric surface active agents such as amino acids, aminosulfonic acids, sulfuric or phosphoric esters of amino alcohols, and alkylbetaines.

Surface active agents for use in the present invention are further described in "Handbook of Surface Active Agents", Sangyo Tosho K.K.

These lubricants and antistatic agents may contain impurities such as isomers, unreacted compounds, by-products, decomposition products and oxides besides the main constituent components thereof. The impurity content is preferably not more than 30% by weight or less, more preferably not more than 10% by weight, based on the weight of the additive.

The type and amount of these lubricants and surface active agents etc., to be incorporated in each of the magnetic layers is readily determined by one of ordinary skill in the art.

The additives for use in the present invention may be entirely or partially added to the system at any step in the process for the preparation of the magnetic coating solution. For example, the additives may be mixed with the ferromagnetic powder before the kneading process. Alternatively, the additives may be added to the system at the step of kneading the ferromagnetic powder, the binder and the solvent. Furthermore, the additives may be added to the system at or after the dispersion step. Moreover, the additives may be added to the system shortly before coating.

In the present invention, any suitable organic solvent can be used in an amount as required to prepare the magnetic coating solutions. Examples of useful organic solvents include ketones such as acetone, methyl ethyl ketone, methyl isobutyl ketone, diisobutyl ketone, cyclohexanone, isophorone, and tetrahydrofuran, alcohols such as methanol, ethanol, propanol, butanol, isobutyl alcohol, isopropyl alcohol, and methylcyclohexanol, esters such as methyl acetate, butyl acetate, isobutyl acetate, isopropyl acetate, ethyl lactate, and glycol acetate, glycol ether such as glycol dimethyl ether, glycol monoethyl ether, and dioxane, aromatic hydrocarbon such as benzene, toluene, xylene, cresol, and chlorobenzene, chlorinated hydrocarbon such as methylene chloride, ethylene chloride, carbon tetrachloride, chloroform, ethylene chlorohydrin, and dichlorobenzene, N,N-dimethylformamide, and hexane.

The non-magnetic support of the present invention has a thickness of from 1 to 100 $\mu$m, preferably 6 to 20 $\mu$m, and the magnetic layers have a total thickness of from 1/100 to 2 times that of the non-magnetic support generally from 0.5 to 10 $\mu$m and preferably from 2 to 5 $\mu$m. The outermost layer of the magnetic layer unit generally has a thickness of from 0.01 to 1.0 $\mu$m, preferably from 0.1 to 0.5 $\mu$m, and the 2nd layer preferably has a thickness of from 0.5 to 1.0 $\mu$m.

An interlayer may be provided between the non-magnetic support and the lowermost magnetic layer such as subbing layer for improvement of adhesion. The interlayer (which is different from a magnetic layer) has a thickness of from 0.01 to 2 $\mu$m, and preferably 0.05 to 0.5 $\mu$m. A back coat layer may be provided on the side of the non-magnetic support opposite to that having the magnetic layers. The back coat layer has a thickness of from 0.1 to 2 $\mu$m, preferably 0.3 to 1.0 $\mu$m. The interlayer or back coat layer may contain known materials generally employed in such interlayers and back coat layers.

The non-magnetic support for use in the present invention includes known suitable films such as polyester (e.g., polyethylene terephthalate, polyethylene naphthalate), polyolefin, cellulose triacetate, polycarbonate, polyamide, polyimide, polyamideimide, and polysulfone. The support may have previously been subjected to surface treatment such as corona discharge, plasma treatment, treatment for facilitating adhesion, heat treatment, and dusting. In order to best obtain the effects of the present invention, the non-magnetic support has a centerline average surface roughness of 0.03 $\mu$m or less, preferably 0.02 $\mu$m or less, more preferably 0.01 $\mu$m or less. Preferably, the non-magnetic support not only has a small centerline average surface roughness, but also is free of coarse protrusions of 1 $\mu$m or more. The shape of the surface roughness is readily controlled by the size and amount of a filler to be optionally incorporated into the support. Examples of useful fillers include oxides and carbonates of Ca, Si and Ti, and finely divided powder of organic compounds such as acryl resins.

The process for the preparation of a magnetic coating solution for the magnetic recording medium of the present invention consists of at least a kneading step, a dispersion step, and mixing step optionally provided either before or after the kneading and dispersion steps.

Each of the kneading, dispersion and mixing steps may be divided into two or more stages.

Materials for use in the present invention such as the ferromagnetic powder, binder, carbon black, abrasive, antistatic agent, lubricant and solvent, etc., may be added to the system at the beginning of or during any step. Each material may be added batchwise to the system at two or more steps. For example, polyurethane may be added batchwise to the system at the kneading step, the dispersion step, and the mixing step for viscosity adjustment after dispersion.

In order to accomplish the objects of the present invention, conventional known manufacturing techniques can be used. At the kneading step, a kneader having a high kneading power such as open kneader, pressure kneader and continuous kneader is preferably used.

In the coating process for the magnetic recording medium of the present invention, a multilayer coating process as disclosed in JP-A-62-212933, 63-88080, and 58-109162 may be is employed.

For the orientation of the magnetic layer, a solenoid having 1,000 G or more and a cobalt magnet having 2,000 G or more are preferably used in combination. Furthermore, a proper drying step is preferably provided before the orientation step to maximize the orientation.

The magnetic recording medium of the present invention can be subjected to calendering by means of a metal roll and a plastic roll or a pair of metal rolls. As the plastic roll, a rolls made of nylon, epoxy, polyimide, polyamide, polyimide amide or the like are preferably used.

In accordance with the present invention, in a magnetic recording medium for AC bias analog recording of a signal having a relatively long wavelength the magnetic layers arranged at a distance of more than 1 μm from the surface of the outermost magnetic layer which experience a low recording magnetic field provide for easy recording and an improved output when the Hc of the magnetic layer is reduced. Furthermore, the deteriorated frequency characteristics in the middle frequency range can be eliminated by providing three or more magnetic layers having a continuous gradation of Hc. As represented by the relationship (I), a magnetic recording medium for recording of a signal in a saturated digital process, chromatic signal low band conversion process or FM process exhibits improved output by providing three or more magnetic layers within a portion of 1 μm, from the surface of the recording medium. Moreover, by providing a steep Hc gradation within a portion of 1 μm from the surface and a shallow Hc gradation in a portion of greater than 1 to 4 μm from the surface layer, excellent output is obtained even if recording of long wavelength signals and short wavelength signals is carried out together.

The present invention is further described with reference to the following non-limiting examples and comparative examples. All parts are given by weight.

EXAMPLE 1

| | |
|---|---|
| Ferromagnetic Powder | 100 parts |
| Vinyl chloride resin (polymerization degree: 350; SO$_3$Na group content: 5 × 10$^{-4}$ mol/g) | 10 parts |
| Polyurethane resin (number average molecular weight: 50,000; SO$_3$Na group: 4 × 10$^{-5}$ mol/g) | 6 parts |
| Carbon black (grain diameter: 80 mμ) | 3 parts |
| α-Alumina | 4 parts |
| Stearic acid | 2 parts |
| Oleic acid | 1 part |
| Butyl stearate | 2 parts |
| Cyclohexanone | 50 parts |

The above described compositions were kneaded by means of a kneader. 200 parts by weight of butyl acetate was then added to the kneaded material and subjected to dispersion by means of a sand mill. 6 parts by weight of a polyisocyanate hardener (Colonate L, produced by Nihon Polyurethane Co., Ltd.) was added to prepare magnetic coating solutions.

The ferromagnetic powders employed were finely divided ferromagnetic powders having the properties for providing an Hc as set forth in Table 1. For an Hc of 1,000 Oe or more, a finely divided ferromagnetic alloy powder was used. For an Hc of between 500 Oe and less than 1,000, a finely divided cobalt-modified iron oxide powder was used. For an Hc of less than 500 Oe, a finely divided iron oxide powder was used.

The various magnetic coating solutions thus obtained were coated in the layer arrangement and having the thickness as indicated in Table 1 onto a 12 μm-thick polyethylene terephthalate film using a simultaneous multilayer coating process. The ferromagnetic powder particles were then oriented by a cobalt magnet and a solenoid, and then dried.

The coated materials thus obtained were calendered, and then cut by a slitter to a predetermined width.

The structure and characteristics of the tapes (Samples No. A-1 to A-14) thus obtained having the thickness and Hc of various layers as set forth in Table 1 were evaluated with respect to output, and S/N for the indicated recording processes. The results are also set forth in Table 1.

EXAMPLE 2

Samples A-15, A-16, A-17 and A-18 were prepared in the same manner as in A-1, A-4, A-5 and A-8 of Example 1, except that the polisocyanate-free dispersions for the uppermost magnetic layer (the 1st layer in Table 1) and the lowermost layer (the 3rd or 4th layer in Table 1) were mixed as set forth in Table 2, and mixed with 6 parts by weight of polyisocyanate to prepare coatings for the 2nd or 3rd interlayer which were then subjected to a simultaneous multilayer coating process in the same manner as in Example 2, respectively.

TABLE 2

| | Preparation of coating solution for 2nd layer | Preparation of coating solution for 3rd layer |
|---|---|---|
| A-15 | Coatings for the 1st and 3rd layers in Sample A-1 were mixed in a 50:50 weight ratio | — |
| A-16 | Coatings for 1st and 4th layers in Sample A-4 were mixed in a 60:40 weight ratio | Coatings for 1st and 4th layers in Sample A-4 were mixed in a 20:80 weight ratio |
| A-17 | Coatings for 1st and 3rd layers in Sample A-5 were mixed in a 66.7:33.3 weight ratio | — |
| A-18 | Coatings for 1st and 4th layers in Sample A-8 were mixed in a 75:25 weight ratio | Coatings for 1st and 4th layers in Sample A-8 were mixed in a 25:75 weight ratio |

COMPARATIVE EXAMPLE

Samples Nos. B-1 to B-3 were prepared in the same manners as in Example 1, except that only two magnetic layers were provided. The characteristics of these conventional tapes are set forth in Table 1.

TABLE 1

| Sample No. | Layer 1 H₁ Oe | Layer 2 H₂ Oe | Layer 2 D₂ μm | Layer 3 H₃ Oe | Layer 3 D₃ μm | Layer 4 H₄ Oe | Layer 4 D₄ μm | Video output dB | Chromatic output dB | Chromatic S/N dB | FM audio output dB | Audio output (Hz) 10K dB | Audio output (Hz) 1K dB | Audio output (Hz) 315 dB | Measuring system Video | Measuring system Audio |
|---|---|---|---|---|---|---|---|---|---|---|---|---|---|---|---|---|
| A-1 | 1600 | 1350 | 0.5 | 1100 | 1.5 | — | — | 5.5 | 5.5 | 4.5 | 1.0 | 4.0 | 3.5 | 2.5 | Metal video | Metal position |
| A-2 | 1600 | 1150 | 1.0 | 700 | 2.5 | — | — | 5.5 | 5.0 | 4.0 | 1.5 | 3.0 | 4.0 | 4.5 | Metal video | Metal position |
| A-3 | 1600 | 1300 | 0.2 | 1000 | 0.5 | — | — | 6.0 | 6.5 | 5.0 | 3.0 | 4.0 | 4.0 | 4.0 | Metal video | Metal position |
| A-4 | 1600 | 1300 | 0.2 | 1000 | 0.5 | 850 | 2.0 | 6.0 | 6.5 | 5.0 | 3.0 | 3.5 | 4.5 | 5.0 | Metal video | Metal position |
| A-5 | 900 | 800 | 0.2 | 600 | 0.5 | — | — | 2.5 | 1.0 | 2.0 | 0.5 | 1.5 | 1.0 | 0.0 | VHS video | Hi position |
| A-6 | 900 | 600 | 0.5 | 400 | 0.8 | — | — | 2.0 | 1.5 | 2.0 | 2.0 | 0.5 | 1.5 | 2.5 | VHS video | Hi position |
| A-7 | 900 | 800 | 0.2 | 600 | 0.5 | 400 | 0.8 | 2.5 | 2.0 | 2.5 | 1.0 | 1.5 | 2.0 | 2.0 | VHS video | Hi position |
| A-8 | 900 | 800 | 0.2 | 600 | 0.5 | 500 | 2.0 | 2.5 | 1.0 | 2.0 | 0.5 | 1.5 | 1.5 | 1.5 | VHS video | Hi position |
| A-9 | 700 | 600 | 0.5 | 500 | 1.5 | — | — | 0.5 | 1.0 | 2.0 | 0.0 | 2.0 | 1.5 | 0.5 | VHS video | Hi position |
| A-10 | 700 | 500 | 1.0 | 400 | 2.0 | — | — | 0.0 | 0.0 | 0.0 | 2.0 | 1.0 | 1.5 | 2.0 | VHS video | Hi position |
| A-11 | 700 | 500 | 1.0 | 400 | 2.0 | 300 | 3.0 | 0.0 | 0.0 | 0.0 | 2.0 | 1.0 | 1.5 | 3.0 | VHS video | Hi position |
| A-12 | 700 | 600 | 0.2 | 400 | 0.5 | — | — | 0.5 | 3.0 | 3.0 | 3.5 | 0.0 | 1.0 | 3.0 | VHS video | Hi position |
| A-13 | 450 | 380 | 0.5 | 350 | 1.5 | — | — | — | — | — | — | −1.5 | −1.0 | −1.0 | — | Normal position |
| A-14 | 450 | 320 | 1.0 | 300 | 2.0 | — | — | — | — | — | — | −1.5 | −1.0 | 0.0 | — | Normal position |
| A-15 | 1600 | 1350 | 0.5 | 1100 | 1.5 | — | — | 5.5 | 5.5 | 5.0 | 1.0 | 4.0 | 3.5 | 2.5 | Metal video | Metal position |
| A-16 | 1600 | 1300 | 0.2 | 1000 | 0.5 | 850 | 2.0 | 6.0 | 6.5 | 5.5 | 3.0 | 3.5 | 4.5 | 5.0 | Metal video | Metal position |
| A-17 | 900 | 800 | 0.2 | 600 | 0.5 | — | — | 2.5 | 1.0 | 2.5 | 0.5 | 1.5 | 1.0 | 0.0 | VHS video | Hi position |
| A-18 | 900 | 800 | 0.2 | 600 | 0.5 | 500 | 2.0 | 2.5 | 1.0 | 2.5 | 0.5 | 1.5 | 1.5 | 1.5 | VHS video | Hi position |
| B-1 | 450 | 320 | 1.0 | — | — | — | — | — | — | — | — | −1.5 | −2.5 | −2.5 | — | Normal position |
| B-2 | 700 | 500 | 1.0 | — | — | — | — | 0.0 | 0.0 | 0.0 | 0.0 | 0.0 | 0.0 | 0.0 | VHS video | Hi position |
| B-3 | 1400 | 1250 | 1.2 | — | — | — | — | 4.5 | 4.0 | 3.6 | 0.5 | 2.5 | 2.5 | 1.5 | Metal video | Metal position |

Measurement method for results presented in Table 1

Video output:

A 50% white video signal was recorded with a reference recording signal. The average output envelope reproduced from the recorded video signal was measured by an oscilloscope. The measurement is represented in dB relative to that of a reference tape.

Chromatic output:

A color video signal was recorded with a reference recording signal. The same measurement method as described above was used to evaluate chromatic output in dB.

Chromatic S/N:

A color video signal was recorded with a reference recording signal. S/N was measured by means of a commercial S/N meter and represented in dB relative to that of a reference tape.

FM audio signal:

A 1.3 MHz signal was recorded as a pseudo FM audio signal through an exclusive head. The level of reproduced output was then determined.

Audio output (10 KHz, 1 KHz, 315 KHz):

Sinusoidal wave signals at a strength of −20 dB relative to the reference level were recorded with a predetermined bias. Audio outputs were represented in dB relative to that of a reference tape.

As shown in Table 1, the magnetic recording tape of the present invention, e.g., B-1, A-13 and A-14, exhibits a higher audio output over all frequency ranges than a conventional tape when applied to analog audio recording using an alternating current bias process.

As shown by comparing Samples B-2 and A-1 to A-12, the magnetic tape of the present invention exhibits a higher video output, chromatic signal output, and FM audio signal output, in addition to analog audio recording output using an alternating current bias process, as compared to conventional tapes.

Samples A-15 to A-18, the interlayer of which had been prepared by mixing the coating solutions for the uppermost layer and lowermost layer, exhibit substantially the same output as that of the samples obtained by separately dispersing coatings for the various layers, and also exhibit a higher S/N than that of the comparative samples.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising on a non-magnetic support having thereon at least three magnetic layers each layer of which containing a ferromagnetic powder dispersed in a binder, wherein the outermost magnetic layer arranged farthest from the support has a dry thickness of 1 μm or less, and said at least three magnetic layers each exhibit coercive force Hc (Oe) satisfying the following relationships:

(when $Dn \leq 1$ μm)

$$H_1 - \frac{Dn \cdot H_1}{1} \leq Hn \leq H_1 - \frac{Dn \cdot H_1}{4} \quad \text{(I)}$$

(when $1$ μm $< Dn \leq 4$ μm)

$$H_1 - \frac{Dn \cdot H_1}{4} \leq Hn \leq H_1 - \frac{Dn \cdot H_1}{40} \quad \text{(II)}$$

wherein $R_1$ represents Hc of the outermost magnetic layer and is not less than 700 Oe; Hn represents Hc of the magnetic layer which is the n-th layer from said outermost magnetic layer and arrange between the outermost layer and the non-magnetic support; and Dn represents the distance (μm) from the top surface of the outermost magnetic layer to the top surface of the n-th layer.

2. A magnetic recording medium as in claim 1, comprising three magnetic layers having a total combined thickness of less than 1 μm.

3. A magnetic recording medium as in claim 1, wherein the particles constituting the ferromagnetic powder have a grain diameter along the major access of 0.5 μm or less.

4. A magnetic recording medium as in claim 1, wherein the ferromagnetic powder has a specific surface area of from 25 to 80 m²/g.

5. A magnetic recording medium as in claim 1, wherein the crystalline size of the ferromagnetic powder is in the range of from 100 to 450 Å angstroms.

6. A magnetic recording medium as in claim 1, wherein the crystalline size of the ferromagnetic powder contained in the outermost layer is smaller than that of the ferromagnetic powder contained in the lowermost magnetic layer.

7. A magnetic recording medium as in claim 1, wherein the binder is selected from a thermoplastic resin, a thermosetting resin, a reactive resin and mixtures thereof.

8. A magnetic recording medium as in claim 1, wherein the binder contains at least one polar group in an amount of from $1 \times 10^{-1}$ to $1 \times 10^{-8}$ mol/g of the binder.

9. A magnetic recording medium as in claim 1, wherein the binder is contained in each magnetic layer in an amount of from 5 to 50% by weight based on the weight of the ferromagnetic power contained in the same magnetic layer.

10. A magnetic recording medium as in claim 1, wherein the ferromagnetic powder has an $H_c$ of from 200 to 2,000 Oe.

11. A magnetic recording medium as in claim 1, wherein the non-magnetic support has a thickness of from 1 to 100 μm.

12. A magnetic recording medium as in claim 11, wherein the total thickness of the magnetic layers is 1/100 to 2 times that of the non-magnetic support.

13. A magnetic recording medium as in claim 1, wherein $H_1$ is not less than 900 Oe.

14. A process for the preparation of a magnetic recording medium, comprising the steps of kneading and dispersing a first ferromagnetic powder in a binder to prepare a magnetic coating solution having an Hc of a predetermined value for the lowermost layer to be arranged nearest to a non-magnetic support, kneading and dispersing a second ferromagnetic powder in a binder to prepare a magnetic coating solution having an Hc of $H_1$ for the outermost layer different than Hc of the lowermost layer, mixing the magnetic coating solution for the outermost layer in such ratio as to provide at least one magnetic coating solution for an interlayer having a predetermined Hc intermediate that of the lowermost and outmost layers, simultaneously coating the magnetic coating solution for the lower most layer, the one or more magnetic coating solutions for the interlayer and the magnetic coating solution for the outermost layer on the non-magnetic support to form a plurality of magnetic layers, subjecting the magnetic layers to orienting treatment, drying the magnetic layers, and then calendaring the magnetic recording medium, wherein the outermost magnetic layer arranged farthest from the support has a dry thickness of 1 μm or less, and said magnetic layers each exhibit coercive force Hc (Oe) satisfying the following relationships:

(when $Dn \leq 1$ μm)

$$H_1 - \frac{Dn \cdot H_1}{1} \leq Hn \leq H_1 - \frac{Dn \cdot H_1}{4} \quad \text{(I)}$$

(when $1$ μm $< Dn \leq 4$ μm)

$$H_1 - \frac{Dn \cdot H_1}{4} \leq Hn \leq H_1 - \frac{Dn \cdot H_1}{40} \quad \text{(II)}$$

wherein $H_1$ represents Hc of the outermost magnetic layer and is not less than 700 Oe; Hn represents Hc of the magnetic layer which is the n-th layer from said outermost magnetic layer and arranged between the outermost layer and the non-magnetic support; and Dn represents the distance (μm) from the top surface of the outermost magnetic layer to the top surface of the n-th layer.

15. A process as in claim 14, wherein $H_1$ is not less than 900 Oe.

* * * * *